FADE COMPENSATING RADIO RECEPTION SYSTEM

Filed Aug. 5, 1964

INVENTOR
M. R. SCHROEDER
BY G. E. Hirsch Jr.
ATTORNEY

United States Patent Office 3,392,336
Patented July 9, 1968

3,392,336

FADE COMPENSATING RADIO RECEPTION SYSTEM

Manfred R. Schroeder, Gillette, N.J., assignor to Bell Telephone Laboratories, Incorporated, New York, N.Y., a corporation of New York Filed Aug. 5, 1964, Ser. No. 387,579
14 Claims. (Cl. 325—474)

ABSTRACT OF THE DISCLOSURE

The effects of high rate fading in radio communication are eliminated by synthesizing an artificial speech signal at the receiver station to replace faded signal portions. Signals reaching the receiver are analyzed to obtain control signals representative of the instantaneous frequency and amplitude of the received signal. These control signals are made to persist during periods when the input signal is subject to fading and thus may be combined in a suitable modulator to produce a synthetic speech signal during such periods.

Figure 1:
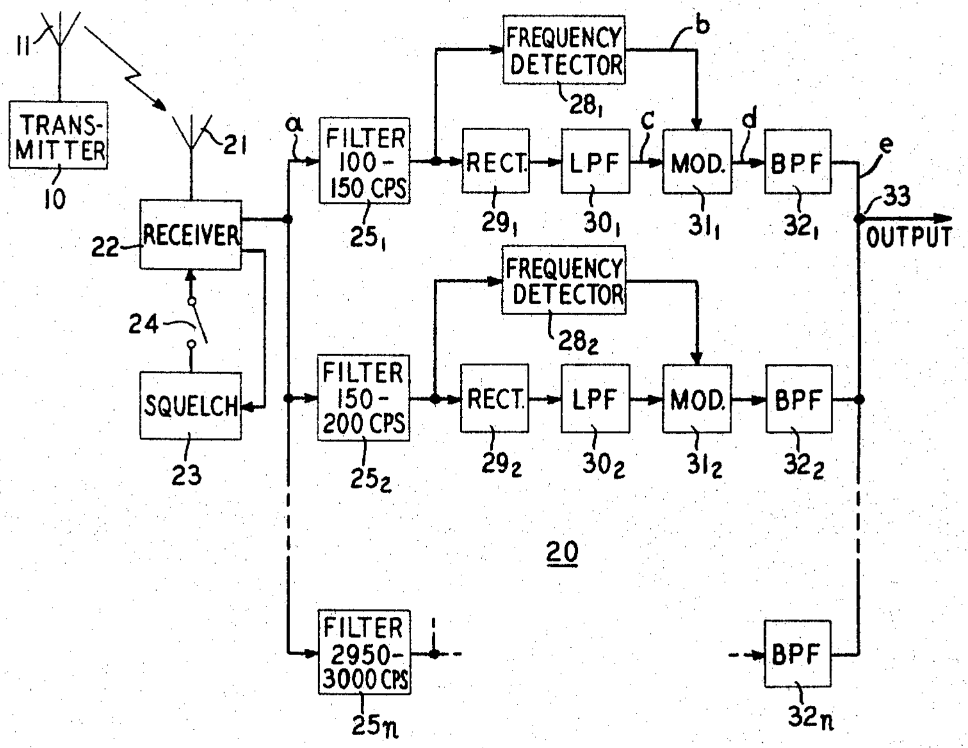

This invention relates to radio communication systems, and, more particularly, to the reception of radio signals whose strength varies appreciably with time.

In communication systems utilizing the propagation of radio waves to convey information between the transmitting and receiving terminals, an effect known as fading, characterized by variations in the strength of the received radio signal, is often encountered. Although fading may be the result of different transmission factors, including atmospheric effects and discontinuities in the transmission medium, the most common type is caused by propagation of the signal over more than one path followed by a recombination of the components from various paths by vector addition at the receiving antenna. The amplitude of the signal at the receiver antenna is thus dependent on the path length differences and amplitudes of the component signals, both of which can vary with time. The resulting phenomena is known as fading due to multipath interference.

Multipath interference, or simply fading, is particularly pronounced as one terminal station moves relative to the other. The rate of fading generally increases as the relative motion between stations is increased and as the transmission frequency is raised. For speech signal transmission, the rate of fading is often as high or higher than the pitch frequency of the signals. Consequently, peaks and nulls in signals reaching the receiver station are not only perceptible, to the point of annoyance, but may lower the signal level below that of the noise level of the system for noticeable intervals. Deep fades into the background noise are obviously unacceptable.

Accordingly, it is the principal object of the present invention to eliminate the effects of signal fading at the receiver station of a radio transmission system.

It is another object to mitigate the effects of signal fading by effectively replacing those signal portions below a threshold of acceptability with locally generated signal portions that closely resemble the unacceptable portions.

These and other objects are accomplished in the present invention by continuously monitoring the received signal and comparing its reception level against a preassigned threshold between acceptable and unacceptable signal levels. The level of background noise may be taken as a reference. Those signal portions which fall below the threshold are removed and replaced with locally generated signals which closely resemble the missing portions.

Interpolation, or the development of suitable fill-in values, for portions deleted from a received signal is, according to the invention, based on the realization that a speech wave may advantageously be treated as a product of two factors: a phase or frequency factor and an amplitude or envelope factor. Accordingly, after degraded portions of a received signal are removed, the signal is applied individually to each of a plurality of frequency sub-band channels which together embrace the entire frequency range occupied by the original signal. In each channel, the wave is applied to two paths connected in parallel. In one of these paths, a clipper or the like derives from the signal a series of pulses of varying durations and of alternately opposite polarities in which the axis crossing instants or zeros of the original wave on the time scale are preserved but all information as to amplitude is discarded. In the other path a rectifier or the like preserves the amplitude information of the original wave and discards all information concerning frequency. In accordance with the invention, a controlled degree of holdover is provided in the envelope detection path, for example, by a suitably long time-constant in the detector or in a filter associated with it. This insures that the amplitude measure of an applied signal decays only gradually from its last value upon the occurrence of a gap in the signal. Similarly, sufficient ringing is provided in the frequency determination path to permit the continued generation of pulses indicative of axis crossings at or near the frequency of the frequency subchannel during gaps in the signal. Finally, the envelope signal, with its holdover during signal fades, is used to modulate the frequency control signal, whether it represents a signal or ringing due to signaling, to produce an approximate replica of the original speech wave.

For signal portions received above threshold, the replica is, of course, a close match to the original. For periods of fading below threshold, the replica is an acceptable substitute and is much to be preferred over the fade itself or an interspersed period of noise. Further, the analysis-synthesis technique is considerably easier to implement than other signal prediction or interpolation techniques which rely on stored past values of received signals. Signal storage is not necessary, and irregularly spaced gaps are readily bridged. Hence, the reconstituting apparatus of the invention may be economically used with a wide variety of communications receivers.

Figure 2:
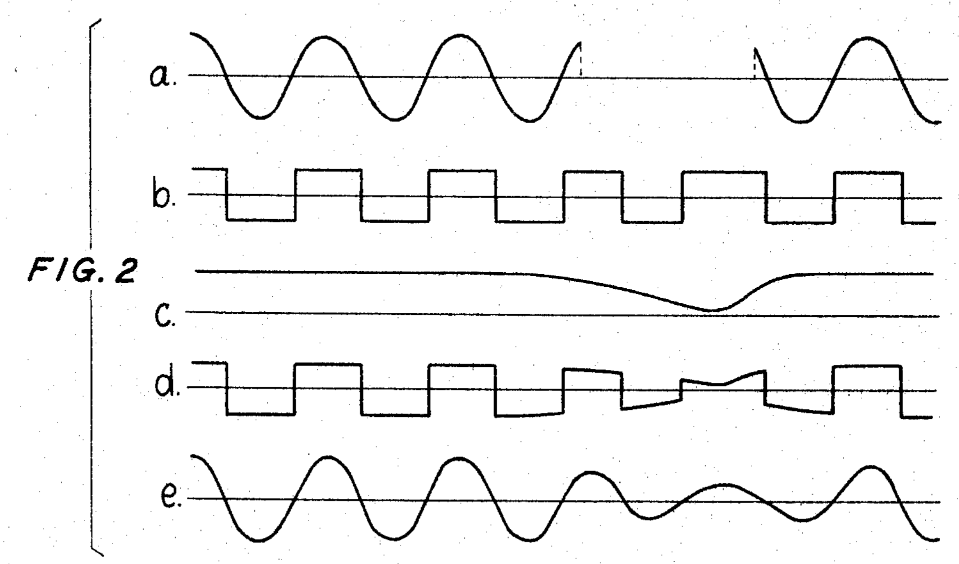

The invention will be fully comprehended from the following detailed description taken in connection with the appended drawings, in which:

FIG. 1 is a block schematic diagram illustrating the invention in one of its simpler forms; and FIG. 2 is a diagram helpful in explaining the operation of the apparatus of FIG. 1.

FIG. 1 shows a two-station communication system, one or both stations of which may be mobile. Signal information which originates at station 10 is modulated in any desired fashion on a carrier signal and transmitted from antenna 11 to antenna 21 at receiving station 20. Received signals are demodulated in receiver apparatus 22 of any desired construction. Since the location of one or both of the stations is ordinarily changing with relation to the other, the signal propagated from station 10 may encounter fading in reaching station 20. It may be, therefore, that the received signal level varies greatly and that the variations may occur at a relatively high rate. Such variations or fades are detected and the recovered signal is interrupted for those intervals determined to be below an established threshold. Any form of gain measuring apparatus and signal switching apparatus may be used for this purpose. Conveniently, a noise eliminator of the so-called squelch type may be employed. Such apparatus, illustrated by way of block 23, is supplied with signal information from receiver 22 and, if required, level information derived in a gain control circuit within the receiver. Squelch circuit 23 matches the signal level to a threshold and generates a keying pulse for those signal intervals below threshold. The keying pulses are supplied by way of switch 24 to receiver 22 wherein they are used effectively to interrupt the signal path at the output of the receiver for the interval. In one mode of operation of the invention, to be described below, squelching is not required. For this mode switch 24 may be opened.

The resulting signal developed at the output of receiver 22, cleared of degraded portions of insufficient signal level, is led in parallel to a number of individual paths. By way of example, the signals supplied to the several paths may be represented by the cosine wave illustrated in line *a* of FIG. 2. The illustrated wave is continuous for most of this representation, but contains a discontinuity established by the chopping action of squelch apparatus 23 in response to a signal whose amplitude was below an acceptable signal threshold.

Each path contains a band-pass filter which accepts for transmission to that path or channel a narrow range of frequencies. Thus, filter $25_1$ may have a pass-band of from 50 to 250 cycles located at the lower end of the frequency range of the applied signal. Filter $25_2$ in the second of the channels may have a similar band-pass of frequencies centered at a higher frequency. Similar filters in the other channels, e.g., filter $25_n$ in the *n*th channel, divide the signal spectrum into contiguous frequency sub-bands which together embrace the entire frequency range occupied by the original signal.

It is in accordance with the present invention to turn to account the inherent properties of narrow band filters to provide the necessary information during interruptions in a signal for the construction of a facsimile of the signal during the interruption. It is well known that as the pass-band of a filter decreases, the transient response likewise becomes poorer. This manifests itself in continued oscillation of the filter at its natural frequency at the cessation of energization. Continued oscillation of this sort, commonly called ringing, persists in nearly sinusoidal form for a considerable interval after the transient. Its rate of decay is largely dependent on the time-constants of the filter and the associated circuits. The narrower the pass-band, the longer the ringing. This property of filters 25 in the individual channels, provides an indication of the frequency of the signal in the particular channel during a signal interruption and, to a lesser degree, an indication of the amplitude of the missing signal. It has been found that amplitude and frequency specifications of this sort are sufficient to control the synthesis of speech for periods up to several hundred milliseconds.

Accordingly, the output of each filter (in the apparatus of FIG. 1) is in turn applied to two parallel paths of which one, the upper one in the figure, may be termed the frequency path and the other, the lower one in the figure, may be termed an envelope path. The frequency path comprises frequency measuring apparatus 28 whose function is to identify each axis crossing or zero value of the wave applied to it and to discard other information bearing features such as amplitude variations. In its simplest form, it may comprise merely a clipper. Alternatively, any form of frequency meter and pulse regenerator is satisfactory. The output of frequency measuring apparatus 28 is a sequence of flat topped pulses, of positive and negative polarities, in alternation and of uniform amplitudes which are independent of the amplitude of the input wave and are dependent only on the clipping operation. A representative sequence of flat topped pulses is illustrated in line *b* of FIG. 2. By virtue of the ringing of filter 25 at its natural frequency, the pulses indicative of axis crossings persist at the cessation of the applied signal and bridge the discontinuity in it.

In the envelope path, an envelope detector operates to preserve that part of the information in the original wave which appears as a variation of its amplitude or envelope. It may comprise a rectifier 29 followed by a low-pass filter 30. The filter is typically proportioned to have a time-constant of the order of $1/300$ second or so, thus to pass components of pitch and syllabic frequencies and to block components of other frequencies. The resultant envelope signal, for the applied cosine wave of line *a* of FIG. 2, is shown in line *c* of the figure. For the example shown, it is relatively constant during the continuous portion of the applied signal and falls off only gradually during the discontinuity.

It is thus apparent that the analysis of the applied signal which takes place in the envelope and frequency paths gives rise to the specification of signal parameters both during signaling and during signal interruptions. Synthesis or reconstitution of the signal is then carried out by applying the continuous frequency signal, line *b* of FIG. 2, from frequency measuring apparatus 28 to one input of modulator 31 and the envelope signal, line *c* of FIG. 2, from filter 30 to the other input of the modulator. The modulator acts to impress the speech envelope on the frequency signal thus approximately to recover the original signal applied to the channels. A typical signal at the output of modulator 31 is shown in line *d* of FIG. 2. This signal is passed through band-pass filter 32 which smooths the wave and restores it nearly to the form of the input, i.e., line *a*, but with the addition of a very close approximation to that signal portion which was lost during the signal interruption.

Reconstituted signals from each of the several channels are then combined, as by addition at point 33, and are available for any desired use.

While modulator 31 provides the simplest synthesis of signals from the envelope and frequency specifications, other synthesizers means may, of course, be employed. For example, the envelope and frequency signals may be employed to control the synthesizer of a voice excited vocoder (VEV) of the sort described in M. R. Schroeder Patent 3,030,450, granted Apr. 17, 1962. In this event the base-band signal, i.e., the entire signal, *a*, is utilized for excitation. As before, the characteristics of the analyzer filters provide the necessary holdover for the specification of amplitude and frequency during signal interruptions.

Snythesis of signals during fading interruptions is most effective with signals which have had the below threshold segments entirely removed. However, for simplicity and with only a slight loss of fidelity, the below threshold signals may be left in the received signal and the synthesized replacement merely superimposed on it. In this mode of operation squelch apparatus 23 is not required. Switch 24 in the open circuit condition denotes this mode.

Further, at extremely high fading rates, shorter than the ringing time of one or more of the filters, it may be preferable to leave the degraded signal portion in the signal rather than to eliminate it, and face the possibility that a suitable fill-in will not be provided. Accordingly, a suitable time response for squelch apparatus 23 is ordinarily provided so that it is active only for longer duration interuptions.

The above described arrangements are, of course, merely illustrative of the application of the principles of the invention. Numerous other arrangements may be devised by those skilled in the at without departing from the spirit and scope of the invention.

What is claimed is:

1. In apparatus for the reception of radio signals, means for reducing the effects of multipath fading which comprises:

means for receiving radio signals;

means for developing, from received radio signals whose strength is above a prescribed threshold of acceptability, control signals which define the spectral envelope of said received above-threshold signals;

means responsive to said control signals for developing replicas of said above-threshold signals;
means responsive to said control signals for developing interpolation signals closely resembling those radio signals received below said threshold; and
means for combining said developed signal replicas and said interpolation signals.

2. In apparatus for the reception of radio signals whose strength varies appreciably with time,
means for reconstituting signals during intervals of below average signal strength which comprises,
means for analyzing received signals whose strength is above an arbitrarily selected level,
means responsive to said analysis for developing control signals indicative of the envelope and frequency constituents of said signals, and
means for using said control signals to synthesize said received signals both during periods of reception of signals above said arbitrarily selected level and during periods of the reception of signal below said arbitrarily selected level.

3. A signal reception system which comprises,
means for recovering the audio frequency modulating signal from a received radio signal,
a plurality of filters, each having a bandwidth sufficiently narrow to assure appreciable ringing and each having an input terminal and an output terminal,
means for applying said recovered signals to the input terminals of all of said filters,
said filters being proportioned to divide the energy of said applied signals into a plurality of contiguous sub-bands which together embrace the frequency band occupied by said applied signals,
an energy channel connected to the output terminal of each of said filters,
means in each of said channels for deriving a first control signal representative of the instantaneous frequency of applied signals and of the controlled ringing of said connected filter in the absence of applied signals,
means in each of said channels having a relatively long time-constant for deriving a second control signal representative of the instantaneous amplitude of said applied signals,
means in each of said channels responsive to said first and said second control signals for synthesizing the signal applied to that channel, and
means for combining the synthesized signals developed in each of said channels.

4. A receiver for radio signals subject to fading which includes,
means for recovering audio frequency message signals from received radio signals,
means for dividing said message signals into a plurality of contiguous sub-bands which together embrace the frequency band occupied by said message signals,
means for individually analyzing each of said sub-band signals to produce a first control signal representative of the instantaneous frequency of said message signal,
and a second control signal representative of the instantaneous amplitude of said message signal,
the time-constant of said analyzer means being sufficiently long to continue the production of said first and said second control signals for appreciable intervals of message signal fading,
means for individually synthesizing sub-band message signals from said first and second control signals, and
means for combining the synthesized message signals from all of said sub-bands.

5. A receiver for radio signals as defined in claim 4 wherein said means for individually analyzing each of said sub-band signals comprises,
a plurality of filters each with a relatively long ringing characteristic and each proportioned to pass a different range of frequencies,
means for supplying said message signals to all of said filters, and
a frequency detector and envelope detector connected in parallel to the output of each of said filters.

6. A receiver for radio signals subject to fading which includes,
means for recovering audio frequency message signals from received radio signals,
means for eliminating message signal portions received below an established threshold level of acceptability,
means for dividing the above-threshold message signals remaining after elimination of said below-threshold portion into a plurality of contiguous sub-bands which together embrace the frequency band occupied by said message signals,
means for individually analyzing each of said sub-band signals to produce a first control signal representative of the instantaneous frequency of said message signal and a second control signal representative of the instantaneous amplitude of said message signal, the time-constant of said analyzer means being sufficiently long to continue the production of said first and said second control signals for appreciable intervals devoid of message signals,
means for individually synthesizing sub-band message signals from said first and second control signals, and
means for combining the synthesized message signals from all of said sub-bands.

7. A receiver for radio signals subject to fading as defined in claim 6 wherein said means for eliminating signal portions received below an established threshold level of acceptability comprises,
means responsive to said recovered message signals for comparing the instantaneous level of said signals to a predetermined fixed level, and
gating means responsive to the difference between said received message signals and said threshold signal for interrupting the delivery of said message signals to said dividing means.

8. In a communication system which includes a first station for the transmission of radio signals and a second station for the reception of radio signals,
means at said second station for regenerating signal portions lost through transmission fading,
said regenerating means comprising,
means for analyzing selected frequency sub-bands of said message signals to produce corresponding pairs of control signals,
each pair representative respectively of the instantaneous frequency and the instantaneous amplitude of said sub-band signals,
said analyzer means having a controlled degree of hold-over whereby said control signals are produced during fading intervals representative of the frequency and amplitude of the last received signal, and
means responsive to said pairs of control signals for synthesizing said received signals.

9. A communication system which comprises a transmitter station and a receiver station spaced apart by a communication channel, means at said receiver station for deriving a first control signal representative of the instantaneous amplitude of received signals and for holding said first control signal for a prescribed interval, means for deriving a second control signal representative of the instantaneous frequency of received signals and for holding said second control signal for a prescribed interval, and means responsive to said first and second control signals for synthesizing said received signals.

10. A communication system which comprises a transmitter station and a receiver station, means at said receiver station for applying received signals to the input terminals of each of a plurality of filters, said filters being proportioned to divide the energy of said applied signals into a plurality of contiguous sub-bands which together embrace the frequency band occupied by said applied signals, a signal channel including parallel energy paths connected to the output terminal of each of said filters, means in one of said paths in each of said channels for deriving a first control signal representative of the instantaneous frequency of applied signals and of the controlled ringing of said connected filter at the cessation of the application of applied signals, means in the other of said paths in each of said channels having a relatively long time-constant for deriving a second control signal representative of the instantaneous amplitude of said applied signals, means in each of said channels for modulating said first control signal with said second control signal, and means for combining the modulated signals developed in each of said channels.

11. A communication system as defined in claim 10 wherein said means for deriving said first control signal comprises, clipping means for producing from said received signals a series of pulses of varying durations and of alternately opposite polarities in which the axis crossing instants of said received signals on the time scale are preserved but all information as to amplitude is discarded.

12. A communication system as defined in claim 10 where said means for deriving said second control signal comprises, detector means for preserving that part of the information in said received signal which appears as a variation of its amplitude and for discarding that part of the information in said received signal which relates to its frequency.

13. A communication system which comprises a transmitter station and a receiver station spaced part by a communication channel, means at said receiver station for deleting received signals whose instantaneous amplitude is below a prescribed threshold, a plurality of filters each having an input terminal and an output terminal, means for applying signals whose instantaneous amplitude is above said threshold to the input terminals of all of said filters, said filters being proportioned to divide the energy of said applied signals into a plurality of contiguous sub-bands which together embrace the frequency band occupied by said applied signals, first and second energy paths connected in parallel to the output terminal of each of said filters, means in each of said first energy paths for deriving a first control signal representative of the instantaneous frequency of applied signals and of the controlled ringing of said connected filter in the absence of applied signals, means in each of said second energy paths having a relatively long time-constant for deriving a second control signal representative of the instantaneous amplitude of said applied signals, means associated with each of said first and second paths for modulating said first control signal with said second control signal, and means for combining the modulated signals so developed.

14. A communication system which comprises a transmitter station, a receiver station, means at said receiver station for deleting received signals whose instantaneous amplitude is below a prescribed threshold, a plurality of relatively narrow band filters, each having an input terminal and an output terminal, means for applying signals whose instantaneous amplitude is above said threshold to the input terminals of all of said filters, said filters being proportioned to divide the energy of said applied signals into a plurality of contiguous sub-bands which together embrace the frequency band occupied by said applied signals, an energy channel connected to the output terminal of each of said filters, an amplitude clipper in each of said channels for deriving a first control signal representative of the instantaneous frequency of applied signals and of the ringing of said connected filter in the absence of applied signals, an envelope detector in each of said channels having a relatively long time-constant for deriving a second control signal representative of the instantaneous amplitude of said applied signals, means in each of said channels for modulating said first control signal with said second control signal, means in each of said channels for smoothing said modulated signal, and means for combining the modulated signals developed in each of said channels.

References Cited

UNITED STATES PATENTS

| | | | |
|---|---|---|---|
| 2,901,601 | 8/1959 | Richardson et al. | 325—474 |
| 2,953,644 | 9/1960 | Miller | 179—15.55 |
| 3,196,354 | 7/1965 | Engelbrecht | 325—478 X |

KATHLEEN H. CLAFFY, *Primary Examiner.*

R. LINN, *Assistant Examiner.*